United States Patent [19]
Mazeaud et al.

[11] Patent Number: 5,327,719
[45] Date of Patent: Jul. 12, 1994

[54] CIRCUIT FOR VENTILATING COMPRESSOR AND TURBINE DISKS

[75] Inventors: Georges Mazeaud, Yerres; Claudine L. M. Planquet, Vert Saint Denis, both of France

[73] Assignee: Societe Nationale d'Etude et de Construction de Moteurs D'Avaiation "SNECMA", Paris, France

[21] Appl. No.: 49,301

[22] Filed: Apr. 21, 1993

[30] Foreign Application Priority Data

Apr. 23, 1992 [FR] France .................. 92 04984

[51] Int. Cl.⁵ ............................... F02C 6/18
[52] U.S. Cl. ......................... 60/39.07; 60/39.75; 415/115; 415/116
[58] Field of Search ............ 60/39.07, 39.75; 415/115, 116

[56] References Cited

U.S. PATENT DOCUMENTS

| | | | |
|---|---|---|---|
| 2,620,123 | 12/1952 | Parducci | 415/115 |
| 2,653,446 | 9/1953 | Price | 415/115 |
| 3,751,909 | 8/1973 | Kohler | 415/115 |
| 3,826,084 | 7/1974 | Branstrom et al. | 60/39.75 |
| 3,943,703 | 3/1976 | Kronogard | 60/39.75 |
| 4,034,558 | 7/1977 | Korta et al. | |
| 4,137,705 | 2/1979 | Andersen et al. | 60/39.75 |
| 4,213,296 | 7/1980 | Schwarz | 415/116 |
| 5,048,288 | 9/1991 | Bessette et al. | 415/116 |
| 5,134,844 | 8/1992 | Lee et al. | 415/116 |
| 5,144,794 | 9/1992 | Kirikami et al. | 60/39.75 |
| 5,174,105 | 12/1992 | Hines | 60/39.07 |

FOREIGN PATENT DOCUMENTS

| | | | |
|---|---|---|---|
| 1040535 | 10/1978 | Canada | 415/115 |
| 1348127 | 3/1974 | United Kingdom | 415/115 |
| 2118629 | 11/1983 | United Kingdom . | |

OTHER PUBLICATIONS

Patent Abstracts of Japan, vol. 9, No. 142 (M-388)(1865), Jun. 18, 1985, JP-A-60 22 003.

Primary Examiner—Henry A. Bennet
Assistant Examiner—Howard R. Richman
Attorney, Agent, or Firm—Oblon, Spivak, McClelland et al.

[57] ABSTRACT

A turbo-engine includes a compressor connected by a shaft to a turbine and includes a plurality of disk stages subjected to a thermal gradient, a gas vein in which the gas circulates from upstream to downstream of the compressor, and a mechanism for ventilating the disks so as to limit their thermal gradient. The ventilation mechanism includes at least, a first and a second source for obtaining the gas from the vein, as well as an operating device so as to independently bring the gas obtained from the first source and the gas obtained from the second source to the disks of the compressor and the turbine. The operating device includes a gas pipe coaxial and outside the shaft, wherein between the pipe and the shaft a cylindrical passage for the gas is provided.

9 Claims, 3 Drawing Sheets

CIRCUIT FOR VENTILATING COMPRESSOR AND TURBINE DISKS

FIELD OF THE INVENTION

The present invention concerns a circuit for ventilating bores of the disks of the HP high pressure compressor and of the turbine of a gas turbine engine.

BACKGROUND OF THE INVENTION

In fact, these turbine engines function at extremely high temperatures. Also, the disks, especially those of the HP compressor and the turbine, are subjected to strong thermic gradients over their height. Thus, it is necessary to ventilate these disks so as to reduce their thermal gradients. In order to do this, a method exists for enabling the air to be taken from the vein of air circulating in the compressor.

Several devices make it possible to embody this taking of air from the air vein. Generally speaking, these devices use centripetal accelerators so as to bring the air to the disks of the downstream stages of the compressor and to the disks of the turbine. Generally speaking, the air penetrates into the compressor at the level of the blades upstream of said compressor. In the middle portion of or downstream of the compressor, at least one portion of the air is subjected to a preliminary flow and then circulates centripetally inside the compressor and is thus directed towards the turbine.

A large number of documents describe centripetal accelerators able to centripetally obtain air from the air vein and direct it towards the downstream disks of the compressor and subsequently towards the disks of the turbine.

The patent application, published under the number U.S Pat. No. 2 609 500 and filed in the name of the applicant on 14 Jan. 1987, describes a turbo-engine compressor disk with a centripetal accelerator so as to suck up air for cooling the turbine.

This type of centripetal air taking device does have the drawback of only comprising a single air sampler, that is a single track for directing the air to the downstream disks of the compressor and turbo-engine. Owing to this, it is impossible to control the flow of taken air and thus regulate the temperature of the ventilation air of the compressor and turbine disks.

SUMMARY OF THE INVENTION

The present invention is able to control this flow of air obtained from the air vein. It concerns taking the air from the air vein centrifugally. In fact, the device of the invention comprises two sources for obtaining air from the vein, each of these being effected centrifugally. From these sources of air, it is possible to regulate the flow of air reintroduced into the motor so as to ventilate the compressor and turbine disks.

More specifically, the present invention concerns a turbo-engine comprising a compressor connected by a shaft to a turbine, said compressor and said turbine each including a plurality of disk stages subjected to a thermic gradient, said compressor further comprising a gas vein in which the gas circulates from a point upstream of the compressor as far as downstream of said compressor. This turbo-engine further comprises ventilators for ventilating the disks so as to limit their thermic gradients. It is characterized in that these ventilators include at least one first and one second source for obtaining gas from the gas vein, as well as a control device for independently bringing the gas obtained from the first source and the gas obtained from the second source to the disks of the compressor and the disks of the turbine respectively.

The control device preferably comprise a gas pipe, which is coaxial with and located outside the shaft, and has between it and the shaft a cylindrical passage for the gas.

In addition, the gas pipe includes one first tube and one second tube inside the first one, the gas being able to circulate inside the cylindrical passage, partitions around each opening ensuring that the gas circulating inside the gas pipe is confined.

According to one preferred embodiment of the invention, the partitions are embodied via the or pressing of the first and second tubes against each other.

According to one characteristic of the invention, the first source is disposed upstream of the compressor. The gas obtained from the latter then circulates in the cylindrical passage and comes out via the radial openings so as to ventilate the disks of the compressor.

As for the second source, this is disposed in the middle of the compressor. The gas obtained from it then circulates inside the gas pipe as far as the disks of the turbine.

According to one preferred embodiment, the turbo-engine further comprises a regulator so as to control the flows of gas obtained by the first and second sources in the gas vein.

BRIEF DESCRIPTION OF THE DRAWINGS

Other advantages and characteristics of the invention shall appear more readily from a reading of the following description given by way of non-restrictive illustration with reference to the accompanying drawings in which:

FIG. 1 diagrammatically shows a turbo-engine section. This figure also shows the various stages of the turbo-engine, namely the bellows 2 which constitutes its first stage, the low pressure compressor 4 and the high pressure compressor, more simply known as the "HP compressor" indicated by reference number 8. A ventilation compartment 6 is able to cool the stage of the HP compressor 8. However, as explained earlier, it is necessary to more precisely ventilate the disks of the stages downstream of the compressor, as well as the disks of the turbine 10. In FIG. 1, the disks of the HP compressor 8 are indicated by reference number 12 and the disks of the turbine 10 are indicated by reference number 14.

Figure 1:
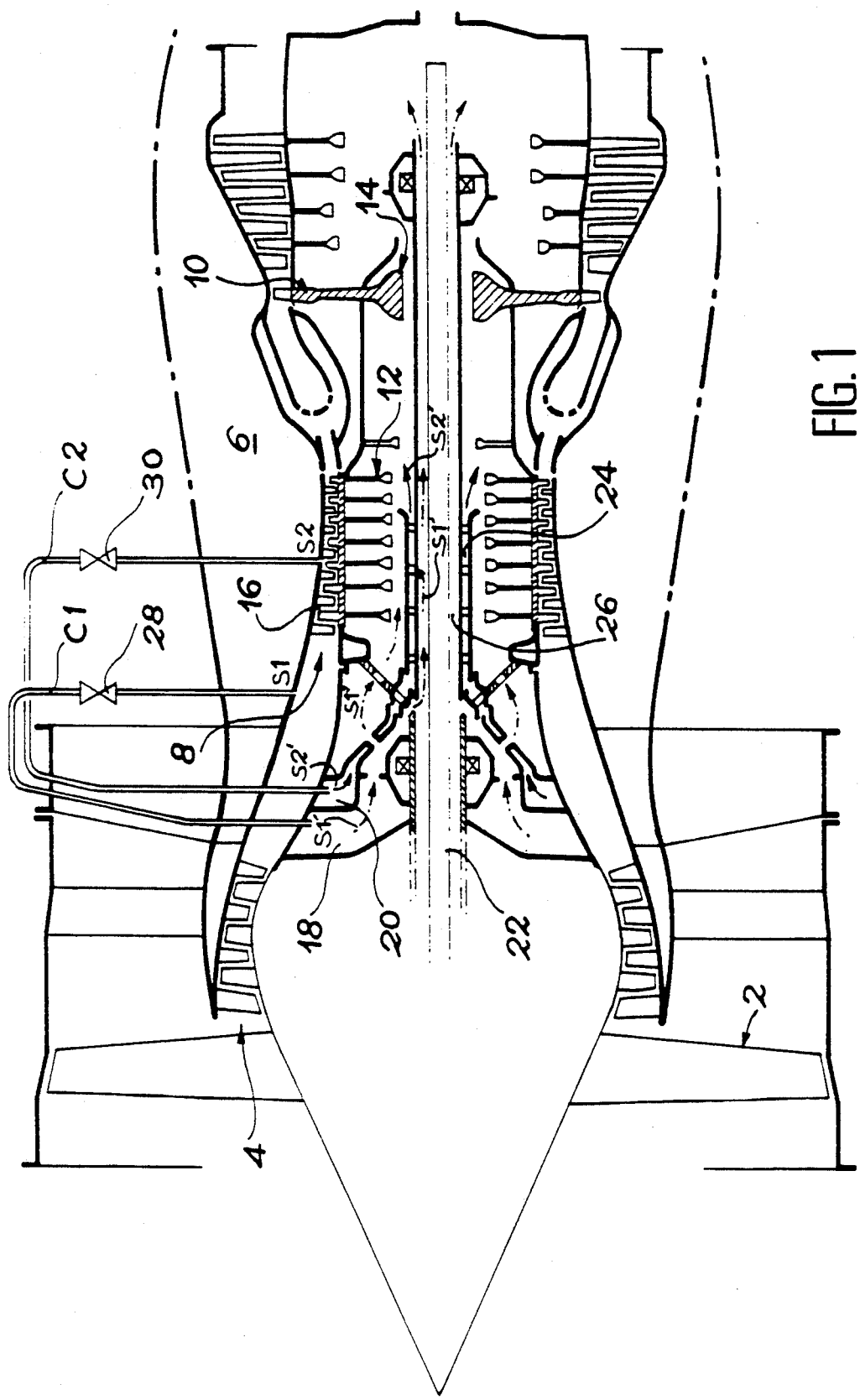
FIG. 1 diagrammatically shows the general main elements of a turbo-engine on which the sources for obtaining air from the air vein have been represented.

The sources S1 and S2 situated respectively upstream of the compressor 8 and in the middle of said compressor 8 make it possible to obtain air from the air vein 16. These air sources S1 and S2 are centrifugal air sources, that is namely picking up the air distanced from the center of the compressor 8 under the effect of the centrifugal force when the turbo-engine is in operation. This air from the sources S1 and S2 is directed upstream of the compressor 8 by the pipes C1 and C2. More specifically, these pipes C1 and C2 and create airflows S1 and S2 traverse the arms of the intermediate housing, that is of the housing situated between the low pressure compressor 4 and the high pressure compressor 8. These pipes C1 and C2 thus traverse the intermediate housing so as to end up respectively in compartments 18 and 20.

This figure also shows the shaft 22 ensuring the physical link between the high pressure compressor 8 and the turbine 10. One portion of this shaft 22 is encompassed by a pipe 24. The air originating from the sources S1 and S2 and transmitted via the compartments 18 and 20 is routed towards the shaft 22 and the pipe 24 by means to be described subsequently. Similarly, the structure of the pipe 24 situated around the shaft 22 and forming a passage 26 between said shaft and said pipe 24 shall be described in detail in the following figures.

In effect, the air obtained by the source S2 is routed via the pipe C2 into the compartment 20 and then towards the pipe 24. This pipe makes it possible to carry the air derived from the source S2 as far as a point downstream of the high pressure compressor 8. The routing of this air derived from the source S2 is shown on FIG. 1 by the full line arrows.

The air taken by the source S1 from the air vein 16 is routed by the pipe C1 into the compartment 18 and then firstly towards the disks of the high pressure compressor 8, and secondly the passage 26 embodied between the shaft 22 and the pipe 24. This air derived from the source S1 may thus be routed towards the disks of the turbine 10.

Valve regulation systems 28 and 30 are communicated with on the respective pipes C1 and C2 so as to make it possible to adjust the flow of air S1' and S2' from the sources S1 and S2 from the air vein 16. In fact, the air S1' from source S1, that is obtained upstream of the compressor 8, has a temperature lower than the air from the source S2 in the middle of said compressor 8 owing to the fact that the air circulating in the air vein 16 upstream of the compressor 8 has a weaker pressure than when it arrives at the level of the source S2, that is in the middle of the high pressure compressor 8. Thus, the air S1' from the source S1 and the air S2' from source S2 have different temperatures which makes it possible to modulate the temperature of the air reinjected into the compressor 8 and the turbine 10. In fact, the valve regulation systems 28 and 30 make it possible to regulate the flow of air from the sources S1 and S2 and thus regulate the temperature of the air reinjected into the motor.

Figure 2:
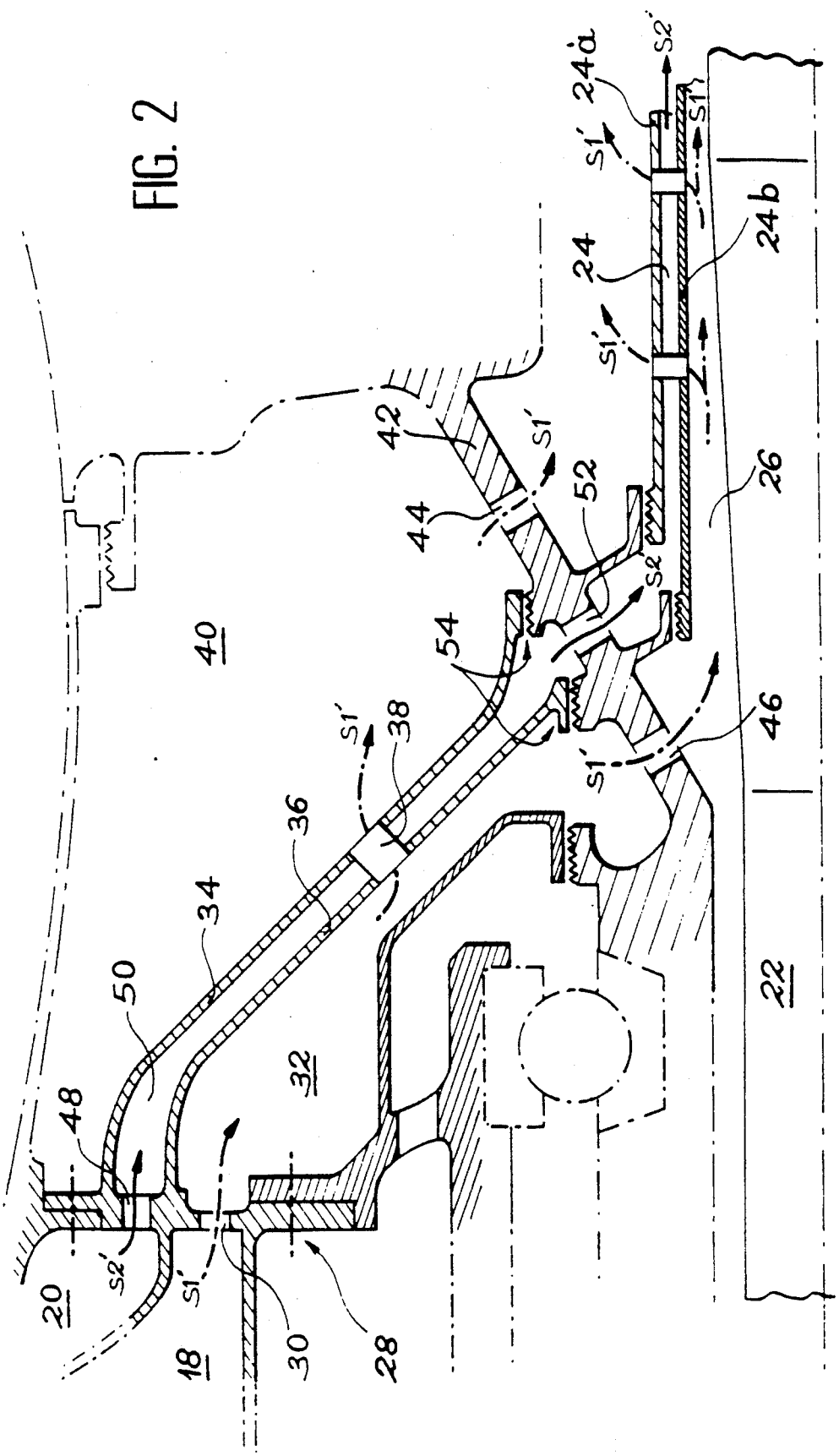
FIG. 2 shows a diagram of the path followed by the air at the outlet of the pipes originating from the air sources and as far as the point where this air is introduced into the pipes enabling the air to be brought to the level of the disks of the HP compressor and the disks of the turbine, these pipes being located at the level of the shaft of the turbo-engine, and FIGS. 3A and 3B each represent one embodiment of the pipes for bringing the air as far as the disks downstream of the compressor and the disks of the turbine.

FIG. 2 shows in greater detail the route followed by the air S1', S2' between the outlet of the pipes C1 and C2 derived from the air taking sources S1 and S2 and the introduction of the air into the ventilation circuits embodied by the shaft 22 and the pipe 24.

This figure also shows one portion of the compartments 18 and 20 which are traversed by the air originating from the pipes C1 and C2 respectively. The air S1' derived from the air source S1 passes from the compartment 18 into the chamber 32 of the bearing (or support for guiding the transmission shaft 22) by traversing the bearing support flange 28 by means of a set of orifices 30. One portion of this air caught in the chamber 32 of the bearing traverses two ferrules 34 and 36 through a passage 38 so as to arrive into a compartment 40. The air comes out of this compartment 40 by traversing the disk ferrule 42 via orifices 44. When the air has traversed this disk ferrule 42, it is able to ventilate the disks of the first stages of the high pressure compressor, that is the disks of the stages upstream of said compressor.

At the same time, another portion of the air situated in the chamber 32 of the bearing does not traverse the fixed ferrules 34 and 36, but directly traverses the rotating disk ferrule 42 via orifices 46 and thus enters into the passage 26 formed by the transmission shaft 22 and the pipe 24. Thus, the air S1' derived from the source S1 is able to circulate in this passage 26 and traverse the entire high pressure compressor so as to reach the turbine.

The air S2' taken by the source S2 is directed into a compartment 20 by the pipe C2 and then traverses the flange 28 of the bearing via orifices 48. The air thus enters into a passage embodied by the two fixed ferrules 34 and 36. This air therefore circulates in this passage 50 and then traverses the rotating ferrule 42 via an orifice 52. At the outlet of this orifice 52, the pipe 24 receives the air derived from the source S2. This air is thus able to circulate in this pipe 24 as far as the disks it needs to ventilate.

As already explained earlier, this pipe 24 comprises two coaxial tubes of approximately different sizes.

The air S2' derived from the source S2 thus circulates in this pipe 24 between the tube 24a and the tube 24b.

This tube 24b inside the tube 24a forms around the transmission shaft 22 a passage, the air derived from the source circulating in said passage.

Imperviousness between the bearing chamber 32 and the passage 50 embodied between the ferrules 34 and 36 is effected at the level of the rotating ferrule 42 with the aid of two brush type or carbon joints or gaskets. These gaskets 54 thus ensure imperviousness between respectively the fixed ferrule 34 and the rotating ferrule 42 and between the fixed ferrule 36 and the rotating ferrule 42. Thus, there is no risk of exchange between the air contained in the bearing chamber 32 and the air contained in the passage 50.

Figure 3A:
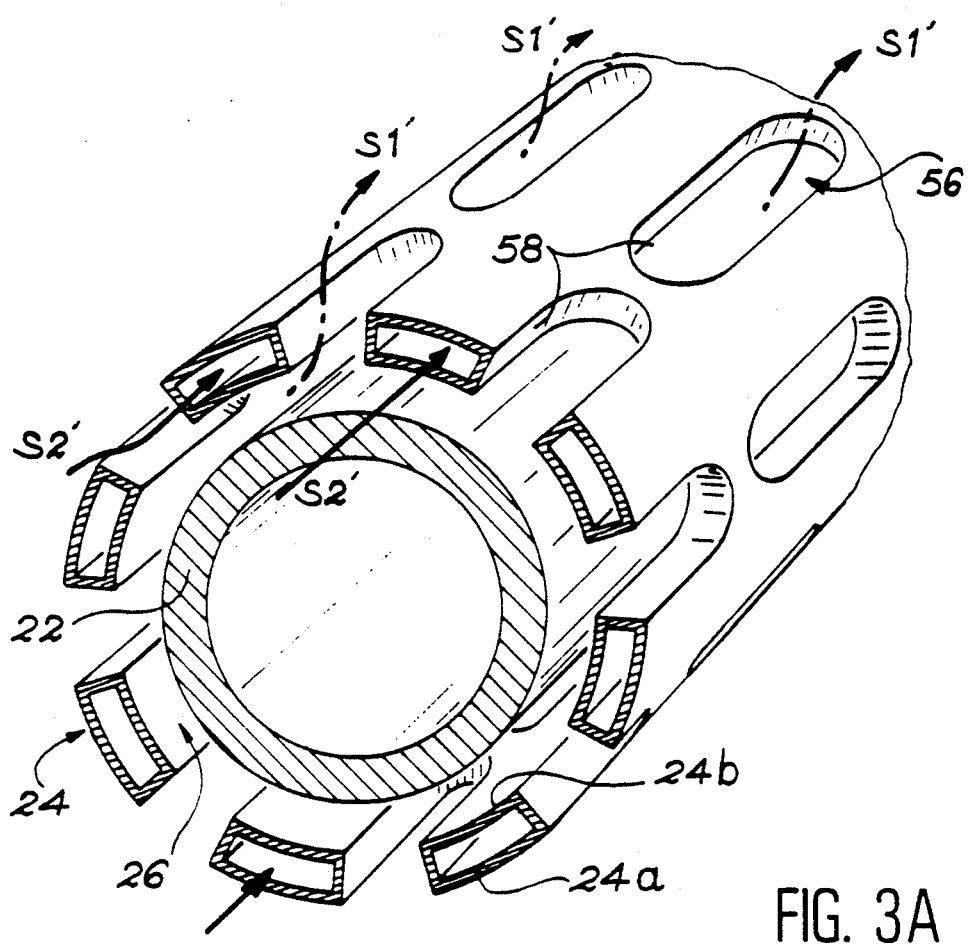
Figure 3B:
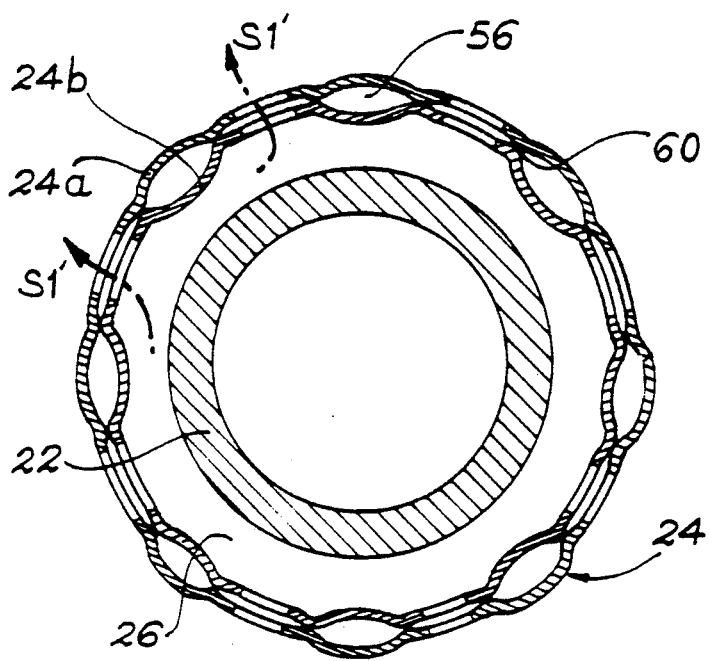

FIGS. 3A and 3B show a section of the shaft 22 and the pipe 24. FIG. 3A and FIG. 3B each represent one embodiment of this unit.

In FIG. 3A, this unit constituted by the transmission shaft 22 and the pipe 24 is shown in perspective. This therefore shows the shaft 22 and the pipe 24 formed of the two tubes 24a and 24b (the tube 24b being inside the tube 24a).

The tubes with a cylindrical section 24a and 24b have oblong openings 56 disposed at regular intervals over the entire length of the tubes 24a and 24b. Partitions 58 ensure the link between the tube 24a and the tube 24b at the level of the openings 56 so as to ensure imperviousness of the pipe 24. By means of these openings, the air derived S1' from the source S1 and circulating in the passage 26 may be removed from said passage 26 via said openings 56 and thus be directed towards the disks of the compressor in order to cool them.

According to one embodiment of the invention, the openings 56 are spaced from one another by intervals almost the same as those existing between two disks of the compressor.

FIG. 3B shows a section of this same unit constituted by the shaft 22 and the pipe 24. This figure shows one embodiment of this unit and differs from the embodiment shown on FIG. 3A.

In effect, according to this embodiment, the partitions 58 are embodied via the crushing or pressing together of the two tubes 24a and 24b so as to obtain a sealed contact between these two tubes 24a and 24b, these crushed portions being indicated by reference number 60. The openings 56 are embodied in a similar way to those shown on FIG. 3A.

Thus, this invention has the advantages of being able to ventilate both the disks of the high pressure compressor and the disks of the turbine of the turbo-engine with air heated to different temperatures. The valve regulation system makes it possible to regulate the air flows so as to control the temperature of the air reinjected onto the disks.

This air flow regulation moreover makes it possible to pilot the clearances between the rotors (of the compressor and the turbine) and the housing.

What is claimed is:

1. A turbo-engine comprising:
   a compressor, a turbine and a transmission shaft connecting the compressor to said turbine, said compressor and said turbine each including a plurality of stages of disks subjected to a thermal gradient, said compressor including a gas vein in which gas circulates from an upstream portion to a downstream portion of the compressor, and
   ventilators for ventilating at least some of the stages of said disks so as to limit the thermal gradient of said disks,
   wherein said ventilators include at least a first and second source for obtaining gas from the vein, as well as a control device to independently communicate gas from the first source and gas from the second source to the stages of disks of the compressor and the turbine wherein the control device includes a compartment located upstream of a high pressure stage of said compressor, a gas pipe communicated with said compartment and located outside of and coaxial with the shaft and a cylindrical passage, located between the gas pipe and the shaft, to which gas from the second source is communicated via said compartment.

2. A turbo-engine according to claim 1, wherein the gas pipe includes a first tube and a second tube located inside the first tube wherein the gas from the first source is circulated between the first and second tubes, as well as between the second tube and the shaft.

3. A turbo-engine according to claim 1, wherein the first source communicates the gas from the gas vein to a position located upstream of the high pressure stage of the compressor.

4. A turbo-engine according to claim 1, wherein the second source obtains gas from the vein at a located corresponding to a middle portion of the compressor.

5. A turbo-engine according to claim 1, wherein the gas from the second source circulates in the gas pipe to a position where the disks of the turbine are located.

6. A turbo-engine according to claim 1, which further comprises a regulator for controlling the flows of gas obtained from the first and second sources from the gas vein.

7. A turbo-engine comprising:
   a compressor, a turbine and a transmission shaft connecting the compressor to said turbine, said compressor and said turbine each including a plurality of stages of disks subjected to a thermal gradient, said compressor including a gas vein in which gas circulates from an upstream portion to a downstream portion of the compressor, and
   ventilators for ventilating at least some of the stages of said disks so as to limit the thermal gradient of said disks wherein said ventilators include at least a first and second source for obtaining gas from the vein as well as a control device to independently communicate gas from the first source and gas from the second source to the stages of disks of the compressor and the turbine wherein the control device includes a compartment located upstream of a high pressure stage of said compressor, a gas pipe communicated with said compartment and located outside of and coaxial with the shaft and a cylindrical passage, located between the gas pipe and the shaft, to which gas from the second source is communicated via said compartment, wherein the gas pipe has a plurality of oblong openings through which the gas circulating in the cylindrical passage flows, and wherein a plurality of partitions are located around each opening for ensuring that the gas circulating in the gas pipe is contained.

8. A turbo-engine according to claim 7, wherein the partitions are embodied via crushing of first and second tubes against one another.

9. A turbo-engine according to claim 7, wherein the gas from the first source circulates in the cylindrical passage and comes out via the radial openings so as to ventilate the disks of the compressor.

* * * * *